(12) United States Patent
Schwartz et al.

(10) Patent No.: US 6,175,210 B1
(45) Date of Patent: Jan. 16, 2001

(54) PRIME MOVER FOR OPERATING AN ELECTRIC MOTOR

(75) Inventors: Jerry H. Schwartz, Calgary (CA); Mark J. Skowronski, Walnut, CA (US)

(73) Assignees: AlliedSignal Power Systems Inc., Albuquerque, NM (US); Mercury Electric Corporation, Calgary (CA)

(*) Notice: Under 35 U.S.C. 154(b), the term of this patent shall be extended for 0 days.

(21) Appl. No.: 09/221,205

(22) Filed: Dec. 23, 1998

(51) Int. Cl.[7] .................................................. H02P 7/00
(52) U.S. Cl. ........................ 318/801; 318/811; 318/732; 318/798; 60/608; 290/52
(58) Field of Search .................................. 318/140, 157, 318/767, 768, 801, 803, 732; 307/67, 64, 66; 290/52

(56) References Cited

U.S. PATENT DOCUMENTS

| | | | |
|---|---|---|---|
| 3,665,495 | * | 5/1972 | Carter et al. ............................. 307/67 |
| 3,829,758 | * | 8/1974 | Studtmann .............................. 322/28 |
| 4,444,285 | * | 4/1984 | Stewart et al. ...................... 180/65.4 |
| 4,727,930 | * | 3/1988 | Bruckner et al. ......................... 165/1 |
| 5,023,537 | * | 6/1991 | Baits ..................................... 318/732 |
| 5,129,328 | * | 7/1992 | Donnelly .............................. 105/65.5 |
| 5,184,456 | * | 2/1993 | Rumford et al. .................... 60/39.02 |
| 5,406,797 | * | 4/1995 | Kawamura ............................. 60/608 |
| 5,512,811 | * | 4/1996 | Latos et al. ............................. 322/10 |
| 5,537,823 | * | 7/1996 | Vogel ..................................... 60/682 |
| 5,581,168 | * | 12/1996 | Rozman et al. ...................... 318/723 |
| 5,635,768 | * | 6/1997 | Birch et al. ............................. 290/40 |
| 5,777,459 | * | 7/1998 | Bansal et al. ........................... 322/47 |
| 5,903,116 | * | 5/1999 | Geis et al. ............................ 318/140 |
| 5,982,645 | * | 11/1999 | Levran et al. ........................... 363/37 |
| 6,020,713 | * | 2/2000 | Geis et al. ............................ 318/801 |
| 6,031,294 | * | 2/2000 | Geis et al. ............................. 290/52 |

* cited by examiner

Primary Examiner—Paul Ip
(74) Attorney, Agent, or Firm—Ephraim Starr; Hugh Gortler

(57) ABSTRACT

A prime mover such as a microturbine generator is operated to generate dc power, and an inverter is controlled to convert the dc power to ac power. The ac power is supplied to an electric motor. The frequency of the ac power is ramped up during motor startup to reduce motor inrush current. The frequency or current of the ac power may be varied in response to process requirements during normal operation of the motor.

20 Claims, 1 Drawing Sheet

PRIME MOVER FOR OPERATING AN ELECTRIC MOTOR

BACKGROUND OF THE INVENTION

The present invention relates to electric motors. More specifically, the invention relates to a method and apparatus for operating ac motors.

A typical oil refinery has a large number of pumps that are driven by electric motors. Electrical power is typically distributed to the electric motors via a power grid. The power grid, in turn, receives electrical power from a remote utility.

Certain drawbacks are associated with distributing electrical power to the motors via such a power grid. For instance, the power grid can be expensive to establish, especially for a large refinery. Additionally, transmission losses can occur across the grid while electrical power is being distributed to the various motors. Transmission losses can also occur while electrical power is being transmitted to the power grid from the remote utility. Moreover, distributing the electrical power can be unreliable.

Certain problems are also associated with the electric motors. Load conditions on the electric motor often vary during normal operation. An electric motor that is operated at a constant speed will operate efficiently under full load conditions, but it will operate inefficiently under part load conditions. Thus, inefficient operation due to variable load operation can pose a problem.

Another problem can occur during startup of the electric motor. During startup, the motor receives an inrush of current. The inrush current is typically four to six times the current received during steady state operation. Consequently, motor power rating is constrained between one-quarter to one-sixth of the maximum power output of the power grid.

The problems arising from variable load conditions and inrush current may be overcome by the use of a variable speed drive. The variable speed drive allows the electric motor to operate more efficiently under part load conditions. The variable speed drive also limits the inrush of current during startup. However, variable speed drives are typically expensive. Additionally, variable frequency drives have internal losses associated with their own operation.

Thus, there is a need to limit inrush current during startup and increase efficiency of the electric motor during normal operation, without the use of a variable speed drive. There is also a need to increase energy savings and improve the reliability of distributing electrical power to the electric motors.

SUMMARY OF THE INVENTION

A system according to the present invention includes an electric motor; a prime mover for generating dc electrical power; an inverter for converting the dc power to ac power; and a controller for causing the inverter to vary at least one of frequency and current of the ac power. The ac power is supplied to the electric motor. The controller can cause the inverter to drive the electric motor at variable speed or torque during motor startup and normal motor operation. Consequently, motor inrush current can be reduced during motor startup, and motor efficiency can be improved during normal motor operation. Moreover, the inrush current can be reduced and the motor efficiency can be increased without the use a conventional variable speed drive.

A prime mover such as a microturbine generator can be located proximate the electric motor. The microturbine generator can distribute electrical power to the electric motor without a power grid, thereby increasing and energy savings and improving reliability of distributing the electrical power.

DESCRIPTION OF THE PREFERRED EMBODIMENT

Figure 1:
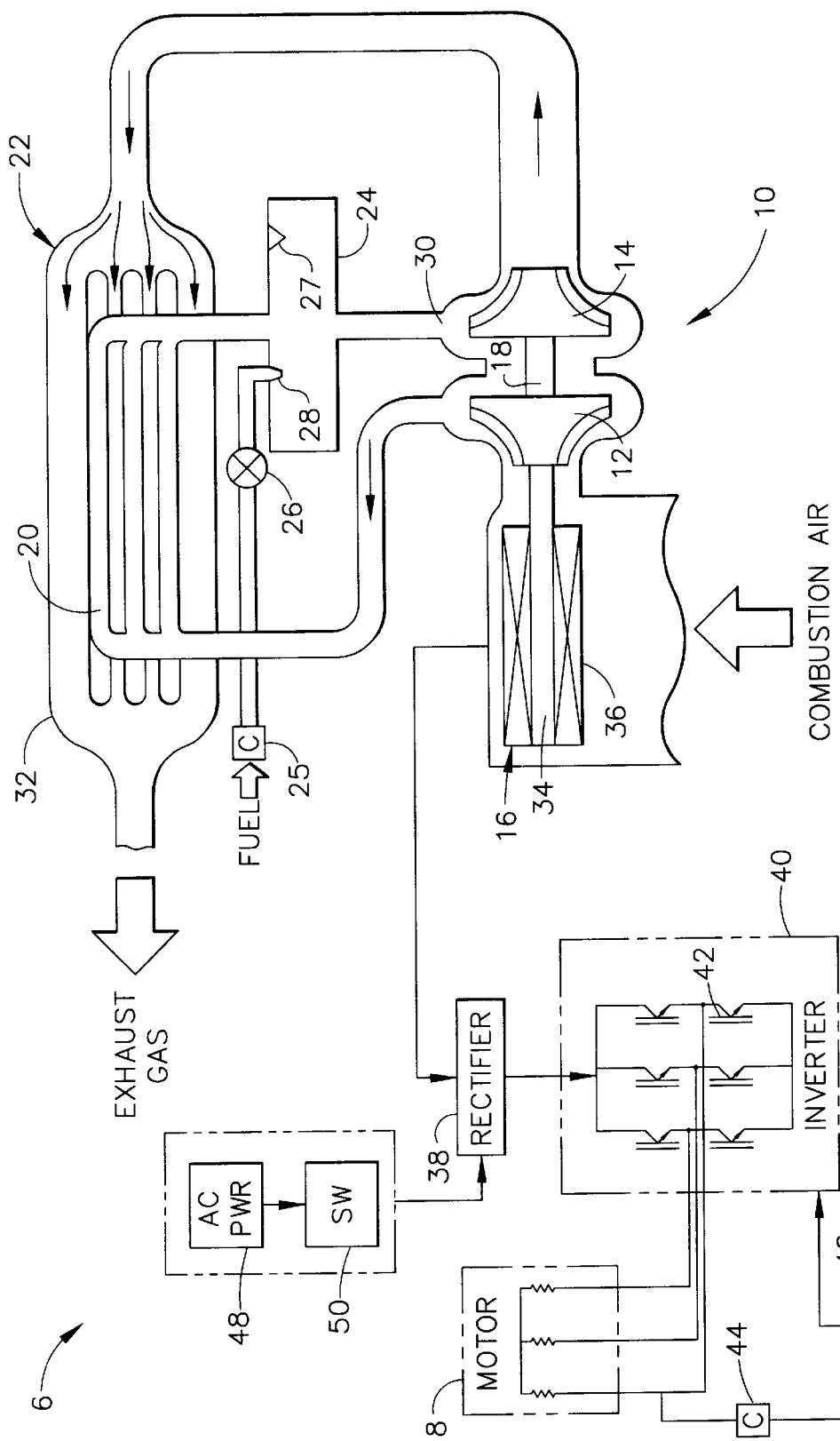
FIG. 1 is a block diagram of a system according to the present invention.
Figure 1:
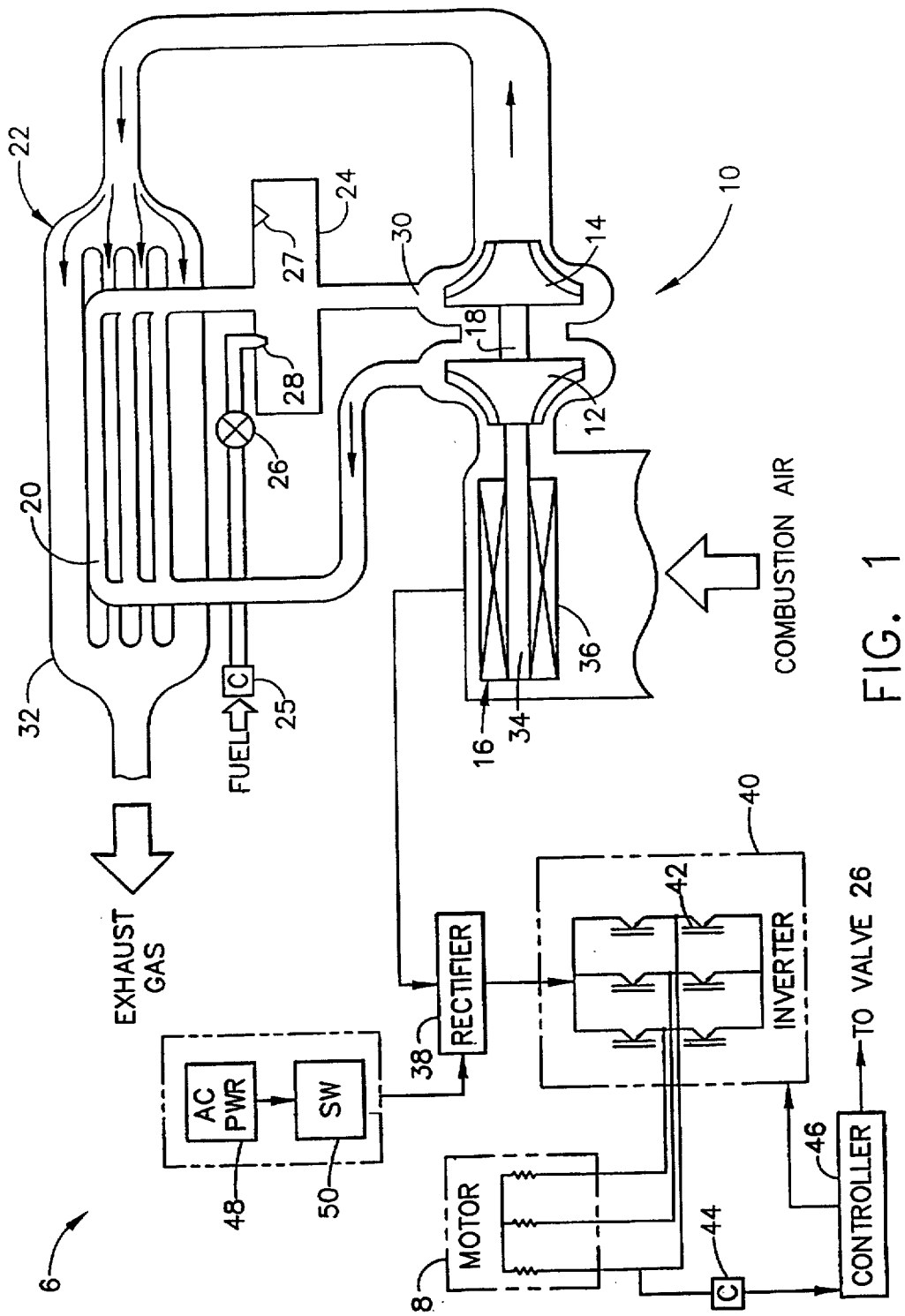

FIG. 1 shows a system 6 including an electric motor 8 and a prime mover for supplying electrical power to the electric motor 8. The electric motor 8 may be part of a device such as a compressor, fan or pump. In an oil refinery, for example, the electric motor 8 of a pump can be an ac induction motor having a power rating of 100 hp.

In a preferred embodiment of the present invention, the prime mover includes a microturbine generator 10. The microturbine generator 10 includes a compressor 12, a turbine 14 and an integrated electrical generator 16. The electrical generator 16 is cantilevered from the compressor 12. The compressor 12, the turbine 14 and the electrical generator 16 are rotated by a single common shaft 18. Although in an alternate embodiment the compressor 12, turbine 14 and electrical generator 16 can be mounted to separate shafts, the use of the single common shaft 18 adds to the compactness and reliability of the microturbine generator 10. The shaft 18 is supported by self-pressurized air bearings such as foil bearings. The foil bearings eliminate the need for a separate bearing lubrication system and reduce the occurrence of maintenance servicing.

Air entering an inlet of the compressor 12 is compressed. Compressed air leaving an outlet of the compressor 12 is circulated through cold side air passages 20 in a recuperator 22. Inside the recuperator 22, the compressed air absorbs heat from the turbine exhaust waste heat. The heated, compressed air leaving the cold side of the recuperator 22 is supplied to a combustor 24. Using the recuperator 22 to heat the compressed air reduces fuel consumption.

Fuel is also supplied to the combustor 24. Either gaseous or liquid fuel may be used. In gaseous fuel mode, any suitable gaseous fuel can be used. Choices of fuel include diesel, flare gas, wellhead natural gas, waste hydrocarbon fuel streams, gasoline, naphtha, propane, JP-8, methane, natural gas and other man-made gases.

If gaseous fuel is chosen, the gaseous fuel may be compressed by a fuel compressor 25 or regulated by a fuel regulator prior to entering the combustor 24. Use of the fuel compressor 25 is preferred if the gas pressure is too low, while use of a regulator is preferred if the pressure is too high to match the required pressure. If the microturbine generator 10 is located on-site at an oil refinery or gas plant, the fuel of choice may be an off-spec stream that would otherwise be incinerated and wasted. If located at an oil well, the fuel of choice may be solution or casing gas that otherwise may be vented or flared. Flaring is wasteful and often does not result in complete combustion of the gas, resulting in an environmental hazard, while a turbine can produce a minimum of bad emissions while converting the gaseous energy into useful mechanical energy.

A flow control valve 26 controls the flow of fuel to the combustor 24. The fuel is injected into the combustor 24 by an injection nozzle 28.

Inside the combustor 24 the fuel and compressed air are mixed and ignited by an igniter 27 in an exothermic reaction. Hot, expanding gases resulting from combustion in the combustor 24 are directed to an inlet nozzle 30 of the turbine 14. The inlet nozzle 30 has a fixed geometry. The hot, expanding gases resulting from the combustion are expanded through the turbine 14, thereby creating turbine power. The turbine power, in turn, drives the compressor 12 and the electrical generator 16. Thus, the turbine converts gaseous heat energy into mechanical energy, and the generator converts mechanical (shaft) energy into electrical energy.

Turbine exhaust gas is circulated by hot side exhaust passages 32 in the recuperator 22. Inside the recuperator 22, heat from the turbine exhaust gas is transferred to the compressed air in the cold side air passages 20. In this manner, some heat of combustion is recuperated and used to raise the temperature of the compressed air prior to combustion. After surrendering part of its heat, the exhaust gas exits the recuperator 22. Additional heat recovery stages could be added onto the power generating system 10.

The generator 16 has a permanent magnet rotor 34 and stator windings 36. The rotor 34 is attached to the shaft 18. When the rotor 34 is rotated by turbine power generated by the rotating turbine 14, an alternating current is induced in the stator windings 36. Speed of the turbine 14 can be varied in accordance with external energy demands placed on the microturbine generator 10. Variations in the turbine speed will produce a variation in the frequency and power generated by the electrical generator 16.

Typically, the turbine 14 will rotate the rotor 34 at speeds greater than 60,000 rpm. Therefore, the generator 16 will generate ac power at frequencies above typical grid frequencies (e.g., 50 to 60 Hz). A rectifier 38 rectifies the high frequency output of the generator 16 to dc power, and the dc power is converted to grid frequency ac power by an inverter 40. The ac power produced by the inverter 40 is distributed directly to the electric motor 8.

Transistors 42 of the inverter 40 are commanded to switch on and off and thereby convert the dc power to the ac power. Controlling the switching or modulation frequency of the transistors 42 can control the frequency of the ac power. Controlling the frequency of the ac power, in turn, can control the speed of the electric motor 8. Controlling the amplitude or depth of modulation controls the output voltage and hence the current to the motor 8.

A controller 46 generates commutation commands that cause the inverter transistors 42 to modulate the dc power. The controller 46 also controls the modulation frequency of the transistors 42 using, for example, a closed loop control including a speed regulator and a speed sensor. The speed sensor generates a feedback signal indicating motor speed. The speed regulator compares a motor speed command to the measured motor speed and generates a switching frequency command that controls the modulation frequency.

By properly commanding the inverter transistors 42 to increase or ramp up frequency of the ac power (and, therefore, the speed of the electric motor 8) during startup, inrush current to the electric motor 8 can be reduced. The rate at which the motor speed is ramped up (and, therefore, the rate at which the frequency is ramped up) can follow a predetermined profile. Thus, the controller 46 can use a predetermined profile of speed versus time to generate the motor speed command. In the alternative, motor current can be measured (by a current sensor 44, for example) and the controller 46 can ramp up the speed command at a controlled rate such that the measured motor current does not exceed a limit.

After the electric motor 8 has reached normal operating conditions (e.g., full speed or full load), the inverter transistors 42 can be commanded to vary the frequency or current of the ac power to track the load conditions of the electric motor 8. For example the break horsepower in a pump varies as the cube of the speed. Controlling the amplitude or depth of the modulation controls the amplitude of the ac power. Controlling the voltage applied to the motor will in turn control the current or torque of the motor. Hence, reducing the frequency or the current of the ac power allows the electric motor 8 to operate more efficiently under part load. The motor load may be measured directly by measuring motor torque, or the motor load may be measured indirectly by measuring motor current, which provides an indication of motor torque.

Whether the current or frequency is varied will depend upon certain process requirements or system parameters. "Process requirements," as used herein, refers not only to necessary conditions of operation of an electric motor, but also to desirable or advantageous conditions of operation. As an example of a process requirement, a pump might be required to pump liquid out of a tank and maintain a constant flow discharge rate regardless of the height of the fluid in the tank. The speed of the pump would remain constant since flow is directly proportional to speed. The controller 46 would use a flow rate transducer as a process variable. A set point would be scaled as flow rate but would actually be a speed set point. The controller 46 would adjust the frequency of the ac power supplied to the pump motor. When the tank is full, suction pressure of the pump will be high, requiring the least amount of torque to maintain the flow. The torque requirement will increase as the level in the tank decreases, and it will reach a maximum when the tank is almost empty. The inverter 40 will therefore deliver the most current when the tank is almost empty and the least current when the tank is full. Thus, a constant speed, variable current (torque) control scheme is preferred given the process requirement associated with pumping liquid from a tank.

On the other hand, if a constant differential across the pump is required, a constant torque and a variable speed control scheme is preferred. Motor current is held constant and motor speed is varied to maintain the differential pressure. If the discharge pressure of the pump increased, the controller 46 increases pump speed in order to maintain the differential pressure across the pump. The discharge pressure varies as the square of the speed and the control is accomplished by increasing the frequency of the ac power and maintaining a constant current.

The controller 46 also controls the turbine speed by controlling the amount of fuel flowing to the combustor 24. The controller 46 uses sensor signals generated by a sensor group to determine the external demands placed upon the microturbine generator 10 and then controls the fuel valve 26 accordingly. The sensor group may include various temperature and pressure sensors for measuring various parameters of the microturbine generator 10. For example, the sensor group may include a shaft speed sensor and a turbine outlet temperature sensor.

Figure 2:
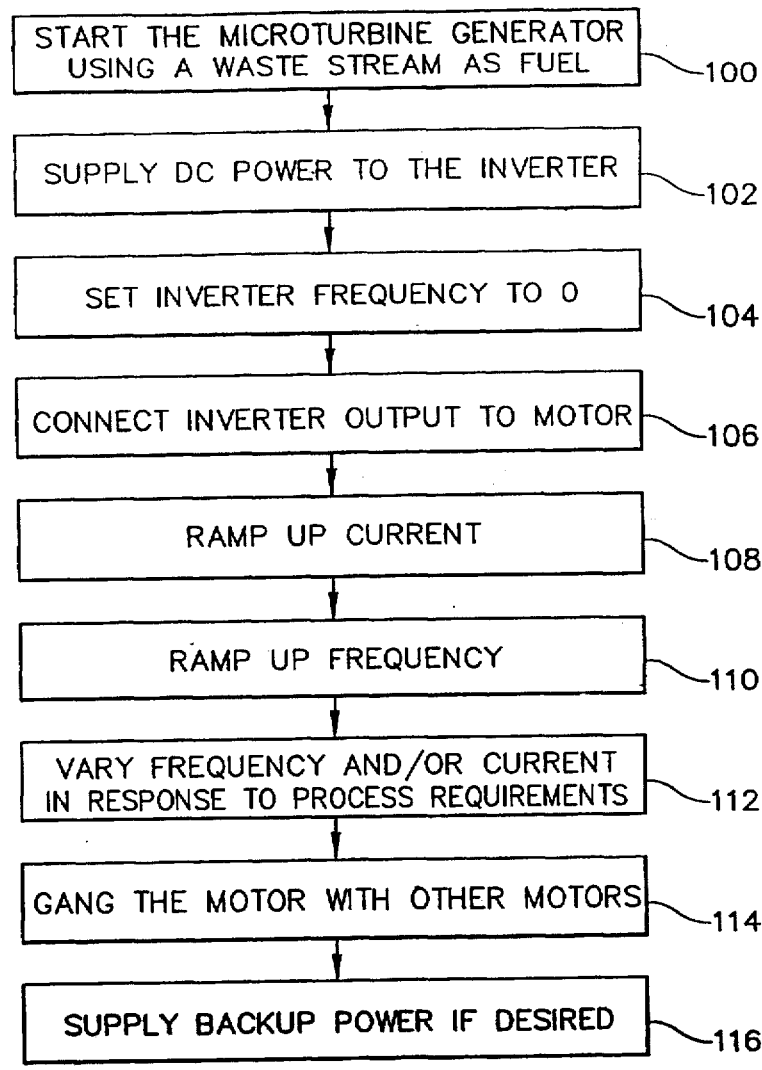
FIG. 2 is a flowchart of a method of operating an electric motor, the method being performed in accordance with the present invention.
Figure 3:
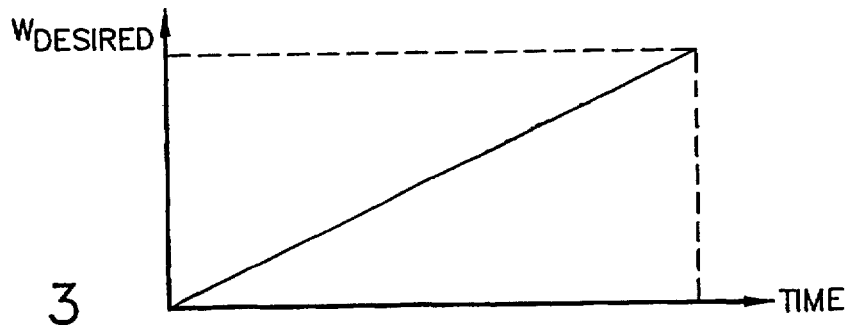
FIG. 3 is an illustration of a frequency profile of ac power supplied to the electric motor during startup.

Referring additionally to FIG. 2, the operation of the electric motor 8 will now be described. The microturbine generator is started (block 100). A fuel such as a waste stream may be used. After the microturbine generator 10 has been started and as is capable of generating electricity, dc power is supplied to the inverter 40 (block 102). The inverter frequency is set to zero (block 104), an output of the inverter 40 is connected to the motor 8 (block 106), and the inverter 40 is commanded to ramp up the current to a normal operating value (block 108). The inverter 40 is then commanded to ramp up the frequency from an initial frequency such as 10 Hz to a desired frequency such as 60 Hz (block 110). An exemplary ramp is shown in FIG. 3. As the frequency is ramped up, the speed of the electric motor 8 is ramped up too. Thus, inrush current is reduced.

Once the electric motor 8 has reached normal operating conditions (e.g., a desired speed or a desired operating load), the inverter 40 is commanded to change the frequency or current in response to process requirements (block 112).

If power demand necessitates, the microturbine generator 10 is preferably ganged or linked with other prime movers to drive the motor 8 (block 114). Also, if the microturbine generator 10 fails to generate power, backup power may be provided by source 48 such as a local power utility or a backup generator (block 116). When backup power is needed, a utility breaker 50 is closed manually or automatically. Ac power from the backup source 48 is rectified by the rectifier 38, modulated by the inverter 40 under control of the controller 46, and supplied to the electric motor 8. Backup power may also be supplied to the controller 46.

The microturbine generator 10 is "plug and play", requiring little more than a supply of clean fuel, liquid or gas. It can be completely self-contained in a weatherproof enclosure. Resulting is a high power density typified by low weight (about a third of the size of a comparable diesel generator) and a relatively small footprint (for example, approximately 3 feet by 5 feet by 6 feet high).

Thus disclosed is an invention that, without the use of a conventional variable speed drive, limits inrush current to an electric motor 8 during startup and increases motor efficiency during normal operation of the motor 8. Eliminating the conventional variable speed drive offers benefits such as reducing the overall cost of operating the motor 8.

A prime mover such as a microturbine generator 10 may be located proximate the electric motor 8. The microturbine generator 10 can distribute electrical power to the electric motor 8 without a power grid, thereby increasing energy savings and improving reliability of distributing the electrical power. The power grid can be eliminated or it can be used for backup power.

The invention can supply power independent of utility electric power. This capability is desirable at a process site that does not have access to utility power. Thus, the invention can significantly reduce the capital cost of those installations where power line construction would be required to bring utility power to the process site.

A standalone microturbine generator 10 that already comes packaged with a controller 46 does not need an additional controller for operating the electric motor 8. The controller 46 can perform "double duty." Resulting is a synergy in using the microturbine generator 10 in combination with the electric motor 8.

The invention can reduce operating costs by utilizing waste fuel sources to generate power, or by utilizing commercial fuel to reduce the electrical cost by peak shaving.

A process plant will frequently have off specification liquid or gas streams that are expensive to get rid of. The waste streams would have to be pressurized to be injected into a plant flare. Thus, energy would be wasted. Furthermore, flares are notoriously inefficient in converting the waste streams into 100% carbon dioxide with low NOx emissions. Therefore, another practical use of the microturbine generator would be to utilize this waste energy stream to produce electrical power. Resulting would be a lower capital cost to dispose of the waste stream, and a more environmentally friendly process since the emissions from the turbine are cleaner than flare emissions.

The present invention is not limited to the specific embodiments disclosed above. For example, the prime mover is not limited to a microturbine generator 10. Other suitable prime movers include internal combustion engines such as those that run on gasoline, diesel, natural gas, propane and other fuels; fuels cells, such as those using phosphoric acid, molten carbonate, proton exchange membranes, and solid oxides; and Stirling engines, Brayton cycle engines, wind turbines and hydroelectric power sources.

Automatic switching can be employed to allow a grid connection after the motor has reached full speed and load. A plurality of prime movers can be "ganged" together to feed a dedicated electric motor. The ganging of prime movers such as microturbine generators allows for larger motors to be driven and controlled.

Figure 4:
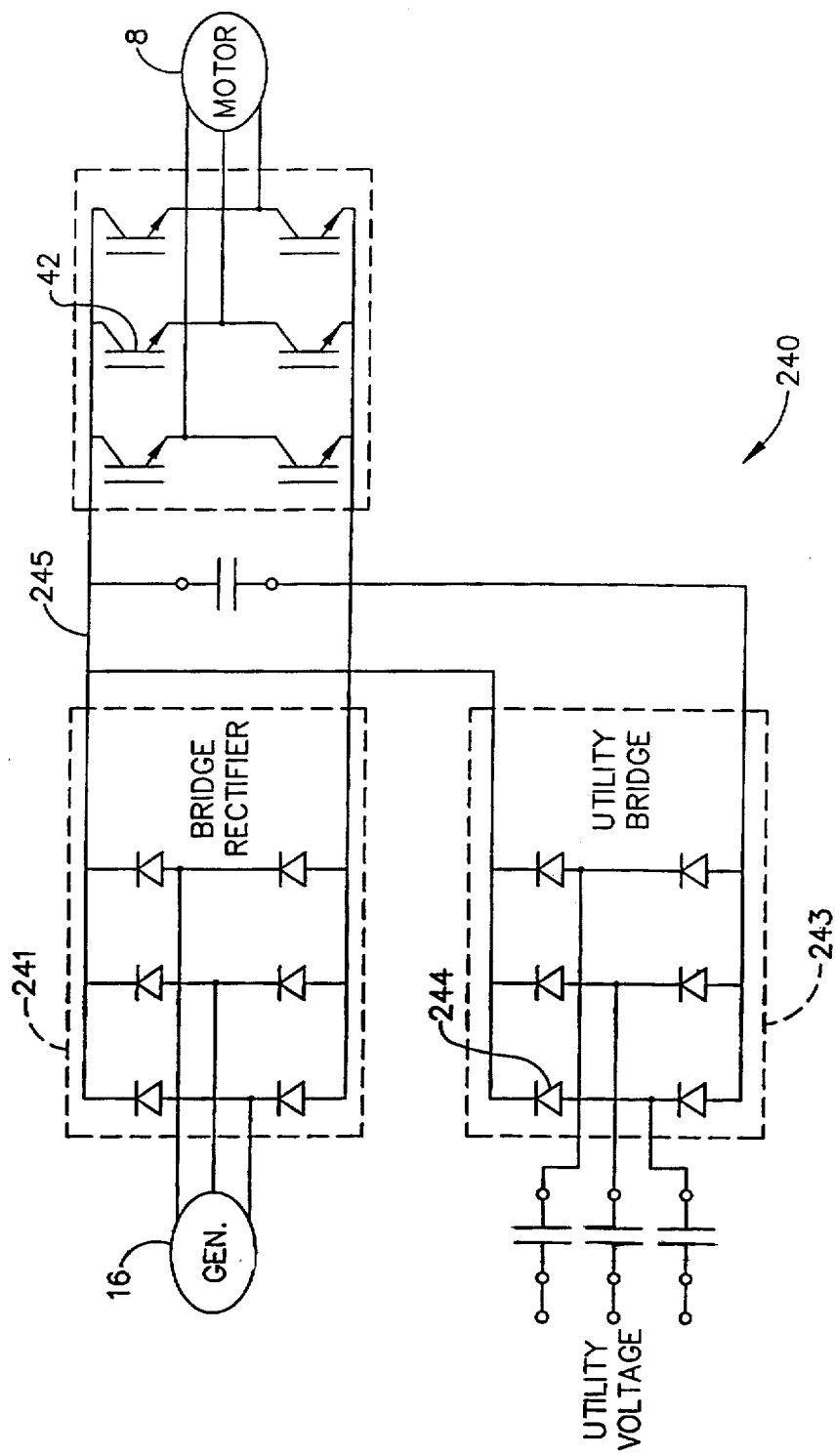
FIG. 4 is an illustration of an alternative embodiment of an inverter for the system.

Utility power can be provided to the system, and the inverter can be configured to automatically transfer the utility power to a process in the event the prime mover fails. Such an inverter 240 is shown in FIG. 4. The inverter 240 includes a dc power bus 245, a bridge rectifier 241 for rectifying the ac power from the generator 16 and placing the rectified power on the dc bus 245, and transistors 42 for modulating the power on the dc bus 245 to produce ac power. The inverter 240 also includes a dc diode utility bridge 243 having an output that parallels an output of the bridge rectifier 241. Bridge diodes 244 of the utility bridge 243 are sourced by utility power. If the voltage of the utility power is slightly lower than the voltage on the dc bus 245, the diodes 244 of the utility bridge 243 will be reversed biased. Therefore, no power will flow from them. However, should the generator 16 fail, the utility power will seamlessly flow to the dc bus 245, thereby taking over supplying the power requirements of the generator 16. Consequently, process reliability is increased by providing backup power in the event either the utility power or the prime mover fail.

Therefore, the present invention is not limited to the specific embodiments disclosed above. Instead, the present invention is construed according to the claims that follow.

What is claimed is:

1. A system comprising:
    an electric motor;
    a prime mover for generating dc electrical power;
    an inverter for converting the dc power to ac power, the ac power being supplied to the electric motor during motor operation; and
    a controller for controlling the inverter to ramp up current of the ac power and ramp up frequency of the ac power during startup of the electric motor, the frequency being ramped up after the current has been ramped up, the current and the frequency being ramped up to reduce motor inrush current.

2. The system of claim 1, wherein the controller causes the inverter to ramp up the frequency according to a predetermined profile.

3. The system of claim 1, wherein the controller causes the inverter to vary the frequency of the ac power to track a process requirement.

4. The system of claim 1, wherein the controller causes the inverter to vary current of the ac power to track a process requirement.

5. The system of claim 1, wherein the prime mover includes a microturbine generator, the microturbine generator including a turbine for converting gaseous heat energy into mechanical energy; an electrical generator for converting the mechanical energy produced by the turbine into electrical energy; and a rectifier coupled to an output of the electrical generator, an output of the rectifier providing the dc electrical power.

6. A system comprising:
an electric motor;
a prime mover for generating ac electrical power;
a dc link;
a first rectifier, coupled between the dc link and an output of the prime mover, for converting the ac power from the prime mover to dc power and supplying the dc power to the dc link;
a second rectifier adapted to convert backup ac power to dc power and directly place the converted backup power on the dc link in the event the prime mover fails;
an inverter, coupled to the dc link, for converting the dc power on the dc link to ac power, the ac power being supplied to the electric motor during motor operation; and
a controller for controlling the inverter to vary at least one of frequency and current of the ac power during operation of the electric motor.

7. A system comprising:
an electric motor;
a microturbine generator for generating dc electrical power, the microturbine generator including a turbine for converting gaseous heat energy into mechanical energy, an electrical generator for converting the mechanical energy produced by the turbine into electrical energy, and a rectifier having an input coupled to an output of the electrical generator, an output of the rectifier providing the dc power;
an inverter for converting the dc power to ac power, the ac power being supplied to the electric motor during motor operation; and
a controller for controlling the inverter to vary at least one of frequency and current of the ac power during operation of the electric motor, wherein the controller also controls the microturbine generator.

8. A system comprising:
an electric motor;
a microturbine generator for generating dc electrical power, the microturbine generator including a turbine for converting gaseous heat energy into mechanical energy, an electrical generator for converting the mechanical energy produced by the turbine into electrical energy, a first rectifier having an input coupled to an output of the electrical generator, an output of the rectifier providing the dc power;
an inverter for converting the dc power to ac power, the ac power being supplied to the electric motor during motor operation; and
a controller for controlling the inverter to vary at least one of frequency and current of the ac power during operation of the electric motor;
wherein the inverter includes a dc power bus, a dc-to-ac converter coupled between the dc power bus and the electric motor, and a second rectifier having an input adapted to receive utility power and an output coupled to the dc bus, an output of the first rectifier also being coupled to the dc power bus.

9. A microturbine power generating system for operating an electric motor at variable speeds, the system comprising:
a turbine for converting gaseous heat energy into mechanical energy;
an electrical generator for converting the mechanical energy produced by the turbine into electrical energy;
a dc rectifier having an input coupled to an output of the electrical generator;
an inverter having an input coupled to an output of the rectifier, an output of the inverter providing ac power to the electric motor; and
a controller for causing the inverter to vary frequency and current of the ac power during operation of the motor, the controller causing the inverter to ramp up the current and then ramp up the frequency during motor startup to reduce motor inrush current.

10. The system of claim 9, wherein the controller causes the inverter to vary the current in response to process requirements during normal operation of the motor.

11. The system of claim 9, wherein the controller causes the inverter to vary the frequency in response to process requirements during normal operation of the motor.

12. The system of claim 9, wherein the controller also controls the operation of the turbine.

13. The system of claim 9, wherein the inverter includes a dc power bus, a dc-to-ac converter coupled between the dc power bus and the electric motor, and a second rectifier having an input adapted to receive utility power and an output coupled to the dc bus, an output of the first rectifier also being coupled to the dc power bus.

14. A method of operating an electric motor, the method comprising the steps of:
operating a prime mover proximate the motor to generate dc electrical power;
using an inverter to convert the dc power to ac power;
supplying the ac power directly to the motor; and
controlling an inverter to vary current and frequency of the ac power during startup of the motor, the current being ramped up and then the frequency being ramped up during startup to reduce motor inrush current.

15. The method of claim 14, wherein the frequency is varied in response to process requirements during normal operation of the motor.

16. The method of claim 14, wherein current of the ac power is varied in response to process requirements during normal operation of the motor.

17. A method of operating an electric motor, the method comprising the steps of:
operating a prime mover proximate the motor to generate dc electrical power;
using an inverter to convert the dc power to ac power;
supplying the ac power directly to the motor;
controlling an inverter to vary at least one of current and frequency of the ac power during operation of the motor; and
converting backup power to variable frequency ac power when the prime mover fails to generate the dc power.

18. A method of operating an electric motor, the method comprising the steps of:
   operating a prime mover proximate the motor to generate dc electrical power;
   using an inverter to convert the dc power to ac power;
   supplying the ac power directly to the motor;
   controlling an inverter to vary at least one of current and frequency of the ac power during operation of the motor; and
   ganging other prime movers with the first prime mover.

19. A method of operating an electric motor, the method comprising the steps of:
   operating a microturbine generator proximate the motor to generate dc electrical power, wherein the microturbine generator is operated using a waste stream for fuel;
   using an inverter to convert the dc power to ac power;
   supplying the ac power directly to the motor; and
   controlling the inverter to vary at least one of current and frequency of the ac power during operation of the motor.

20. A system comprising:
   an electric motor;
   a prime mover for generating dc electrical power;
   an inverter for converting the dc power to ac power, the ac power being supplied to the electric motor during motor operation; and
   a controller for controlling the inverter to limit motor current during startup until the motor reaches a predetermined speed;
   wherein the motor current is limited by ramping up frequency and controlling depth of inverter modulation.

* * * * *

UNITED STATES PATENT AND TRADEMARK OFFICE
CERTIFICATE OF CORRECTION

PATENT NO. : 6,175,210 B1            Page 1 of 4
DATED : January 16, 2001
INVENTOR(S) : Schwartz, et al.

It is certified that error appears in the above-identified patent and that said Letters Patent is hereby corrected as shown below:

<u>Drawings,</u>
The Drawing Sheet, consisting of Figures 1 should be deleted to be replaced with the four (4) drawing sheets, as shown on the attached pages.

Signed and Sealed this

Twenty-seventh Day of November, 2001

*Attest:*

NICHOLAS P. GODICI
*Attesting Officer*     Acting Director of the United States Patent and Trademark Office